US011524278B2

(12) United States Patent
Alcaniz et al.

(10) Patent No.: US 11,524,278 B2
(45) Date of Patent: Dec. 13, 2022

(54) HYDROTREATING CATALYST WITH A TITANIUM CONTAINING CARRIER AND SULFUR CONTAINING ORGANIC ADDITIVE

(71) Applicant: Albemarle Europe SRL, Louvain-la-Neuve (BE)

(72) Inventors: Jana Juan Alcaniz, Amsterdam (NL); Jacob Arie Bergwerff, Amsterdam (NL); Kar Ming Au Yeung, Amsterdam (NL); Wilhelmus Clemens Jozef Veerman, Volendam (NL)

(73) Assignee: ALBEMARLE EUROPE SRL, Louvain-la-Neuve (BE)

( * ) Notice: Subject to any disclaimer, the term of this patent is extended or adjusted under 35 U.S.C. 154(b) by 0 days.

(21) Appl. No.: 16/631,925

(22) PCT Filed: Jul. 20, 2018

(86) PCT No.: PCT/EP2018/069775
§ 371 (c)(1),
(2) Date: Jan. 17, 2020

(87) PCT Pub. No.: WO2019/016375
PCT Pub. Date: Jan. 24, 2019

(65) Prior Publication Data
US 2020/0156051 A1    May 21, 2020

Related U.S. Application Data

(60) Provisional application No. 62/535,610, filed on Jul. 21, 2017.

(51) Int. Cl.
| | |
|---|---|
| *B01J 27/19* | (2006.01) |
| *B01J 21/06* | (2006.01) |
| *B01J 31/02* | (2006.01) |
| *B01J 31/38* | (2006.01) |
| *B01J 37/00* | (2006.01) |
| *B01J 37/02* | (2006.01) |
| *B01J 37/08* | (2006.01) |
| *C10G 45/08* | (2006.01) |

(52) U.S. Cl.
CPC ............ *B01J 27/19* (2013.01); *B01J 21/063* (2013.01); *B01J 31/0229* (2013.01); *B01J 31/38* (2013.01); *B01J 37/0009* (2013.01); *B01J 37/0203* (2013.01); *B01J 37/024* (2013.01); *B01J 37/0205* (2013.01); *B01J 37/088* (2013.01); *C10G 45/08* (2013.01); *B01J 2231/005* (2013.01); *B01J 2531/002* (2013.01); *C10G 2300/104* (2013.01); *C10G 2300/1074* (2013.01); *C10G 2300/202* (2013.01); *C10G 2300/30* (2013.01)

(58) Field of Classification Search
CPC . B01J 21/04; B01J 21/063; B01J 23/24; B01J 23/38; B01J 23/652; B01J 23/74; B01J 23/85;

USPC ....................................................... 502/313
See application file for complete search history.

(56) References Cited

U.S. PATENT DOCUMENTS

| | | | |
|---|---|---|---|
| 4,028,227 A | 6/1977 | Gustafson | |
| 4,465,790 A | 8/1984 | Quayle | |
| 4,992,403 A | 2/1991 | Yasuhito et al. | |
| 4,997,801 A | 3/1991 | Mitarai et al. | |
| 5,229,347 A * | 7/1993 | Prada ............... | B01J 21/063 |
| | | | 502/221 |
| 5,384,297 A * | 1/1995 | Prada ............... | B01J 21/063 |
| | | | 502/66 |
| 6,090,745 A | 7/2000 | DuBois et al. | |
| 6,267,874 B1 | 7/2001 | Iijima et al. | |
| 6,280,610 B1 | 8/2001 | Uragami et al. | |
| 6,383,975 B1 | 5/2002 | Rocha et al. | |
| 7,169,294 B2 | 1/2007 | Abe et al. | |
| 7,968,069 B2 * | 6/2011 | Rayo Mayoral ..... | B01J 37/0207 |
| | | | 423/242.1 |
| 9,061,265 B2 | 6/2015 | Seki et al. | |
| 9,067,191 B2 | 6/2015 | Seki et al. | |
| 9,415,384 B2 * | 8/2016 | He ................... | B01J 37/03 |
| 9,463,452 B2 | 10/2016 | Inoue et al. | |
| 9,776,180 B2 | 10/2017 | Inoue et al. | |
| 10,071,370 B2 | 9/2018 | Inoue et al. | |

(Continued)

FOREIGN PATENT DOCUMENTS

| | | |
|---|---|---|
| CN | 101722006 A | 6/2010 |
| CN | 104588031 | 5/2015 |

(Continued)

OTHER PUBLICATIONS

Berg, S.G. Habibullin, Catalytic hydroskimming of oil, Leningrag, 1986, 192 pages, e.g. p. 97.

(Continued)

*Primary Examiner* — Patricia L. Hailey
(74) *Attorney, Agent, or Firm* — Nathaniel C. Dunn

(57) ABSTRACT

Generally, it is disclosed a catalyst for use in a hydrotreating hydrocarbon feedstocks and the method of making such catalyst. It is generically provided that the catalyst comprises at least one Group VIB metal component, at least one Group VIII metal component, about (1) to (about (30) wt % C, and preferably about (1) to about (20) wt % C, and more preferably about (5) to about 15 wt % C of one or more sulfur containing organic additive and a titanium-containing carrier component, wherein the amount of the titanium component is in the range of about (3) to (about (60) wt %, expressed as an oxide (Ti0$_2$) and based on the total weight of the catalyst. The titanium-containing carrier is formed by co-extruding or precipitating a titanium source with a Al2O3 precursor to form a porous support material comprising Al$_2$O$_3$ or by impregnating a titanium source onto a porous support material comprising Al$_2$O$_3$.

8 Claims, No Drawings

(56) References Cited

U.S. PATENT DOCUMENTS

| | | | |
|---|---|---|---|
| 2001/0046939 | A1 | 11/2001 | Eijsbouts |
| 2007/0135300 | A1 | 4/2007 | Kagami et al. |
| 2007/0135330 | A1* | 6/2007 | Ford .................. C11D 3/26 |
| | | | 510/499 |
| 2008/0132407 | A1 | 6/2008 | Bai et al. |
| 2009/0258779 | A1* | 10/2009 | McCarthy .......... B01J 23/85 |
| | | | 502/24 |
| 2009/0261019 | A1 | 10/2009 | McCarthy et al. |
| 2012/0168347 | A1 | 5/2012 | Eijsbouts-Spickova et al. |
| 2012/0190541 | A1* | 7/2012 | Koranne .......... B01J 37/0221 |
| | | | 502/439 |
| 2012/0216449 | A1* | 8/2012 | Hayasaka .......... B01J 29/7461 |
| | | | 44/307 |
| 2013/0153467 | A1 | 6/2013 | Seki et al. |
| 2020/0023339 | A1* | 1/2020 | Schmidt .......... B01J 23/883 |
| 2020/0222887 | A1* | 7/2020 | Alcaniz .......... B01J 37/0205 |

FOREIGN PATENT DOCUMENTS

| | | | |
|---|---|---|---|
| CN | 103721693 B | 3/2016 | |
| FR | 2791277 B1 | 4/2001 | |
| JP | 2817622 B2 | 10/1998 | |
| JP | 2005-262173 * | 9/2005 | .......... B01J 27/19 |
| JP | 2005262173 A | 9/2005 | |
| RU | 2242283 C2 | 12/2004 | |
| RU | 2343974 C2 | 1/2009 | |
| RU | 2352394 C1 | 4/2009 | |
| RU | 2387480 C2 | 4/2010 | |
| RU | 2474474 C1 | 2/2013 | |
| WO | 1996/41848 | 12/1997 | |
| WO | 2001/076738 | 10/2001 | |
| WO | 2001/076741 | 10/2001 | |
| WO | 2008/045550 | 4/2008 | |
| WO | 2011/023668 | 5/2011 | |
| WO | 2016/170188 | 10/2016 | |

OTHER PUBLICATIONS

Panchenkov, V.P. Lebedev, Chemical kinetics and catalysis, Publishing House of the Moscow University, 1961, p. 309.

Solid catalysts, their structure, composition and catalytic effect: Monogrophy 1, Publishing House "Neft Gas", I/.M. Gubkin Russian State Oil and Gas University 2000, 372 pages, in particular, p. 10.

Russian Office Action re Application No. 2020107708 dated Oct. 20, 2021.

International Search Report and Written Opinion for Application No. PCT/EP2018/069775 dated Jan. 24, 2019.

\* cited by examiner

HYDROTREATING CATALYST WITH A TITANIUM CONTAINING CARRIER AND SULFUR CONTAINING ORGANIC ADDITIVE

TECHNICAL FIELD

The present invention is in the field of catalysts useful for hydrotreating hydrocarbon feedstocks in refining processes.

THE INVENTION

In general, hydrotreating catalysts are composed of a carrier having deposited thereon a Group VIB (of the Periodic Table) metal component and a Group VIII (of the Periodic Table) metal component. The most commonly employed Group VIB metals are molybdenum and tungsten, while cobalt and nickel are the conventional Group VIII metals. Phosphorus may also be present in the catalyst. The prior art processes for preparing these catalysts are characterized in that a carrier material is composited with hydrogenation or hydrotreating metal components, for example by impregnation, after which the composite is generally calcined to convert the metal components into their oxides. Before being used in hydrotreating, the catalysts are generally sulfided to convert the hydrogenation metals into their sulfides. Processes for activating and regenerating such catalysts are also known.

The use of $TiO_2$-containing carriers in hydroprocessing catalysts, which are generally calcined after application of the active metals, is widely known. The inclusion of $TiO_2$ in the hydroprocessing carriers has commonly been reported to show higher desulfurization activity, but the fundamentals behind such behavior are not well understood. For example, US Patent Publications US20120181219 and US20130153467 disclose a metal component selected from Groups VIA and VIII in the periodic table, supported on a silica-titania-alumina support where the total of the diffraction peak area indicating the crystal structure of anatase titania (101) planes and the diffraction peak area indicating the crystal structure of rutile titania (110) planes is ¼ or less of the diffraction peak area indicating the aluminum crystal structure ascribed to γ-alumina (400) planes, as measured by X-ray diffraction analysis. However, these references fail to disclose the combination of the present invention, (i.e. the combination of a $TiO_2$ containing support and the use of sulfur containing organic additive).

Another example is U.S. Pat. No. 6,383,975 which discloses a catalyst that uses a support consisting on an alumina matrix, having dispersed on its surface or in its mass, or in both, a metal oxide from group IVB of the periodic table. The support is prepared by co-precipitation technique, co-gelification or impregnation of the alumina with a Ti compound, soluble in an organic solvent, followed by drying at 100 to 200° C. and calcination at 400 to 600° C., on oxidizing atmosphere. However, this reference also fails to disclose the combination of the present invention as it does not disclose the synergistic effect of titanium and sulfur organic additives.

Another example is U.S. Pat. No. 9,463,452 which discloses a catalyst that uses a titania coated alumina particles shaped into extrudates. The hydrotreating catalyst then supports a periodic table group 6 metal compound, a periodic table group 8-10 metal compound, a phosphorus compound, and a saccharide. The invention of the '452 patent is limited to a very specific manufacturing process and only to the use of saccharides as potential additives.

It was found that by using $TiO_2$-containing carriers in combination with the use of certain sulfur containing organics in the preparation method, highly active hydrotreating catalysts can be made. The activity of these catalysts is higher than (i) what can be achieved on a conventional $Al_2O_3$ support with the same organic or (ii) when the $TiO_2$-containing catalysts are being prepared without sulfur containing organics. Moreover, it appears the activity of the active phase in the catalyst prepared with $TiO_2$-containing supports in combination with sulfur containing organics is higher than can be expected based on the effect of the individual contributions of these parameters. This higher active phase activity can be applied to generate hydrotreating catalysts with a superior volumetric activity or catalysts with high activity at considerably lower concentrations of the active Group VIB and Group VIII metal components.

Thus, in one embodiment of the invention there is provided a catalyst comprising at least one Group VIB metal component, at least one Group VIII metal component, about 1 to about 30 wt % C, and preferably about 1 to about 20 wt % C, and more preferably about 5 to about 15 wt % C of one or more sulfur containing organic additive and a titanium-containing carrier component, wherein the amount of the titanium component is in the range of about 3 to about 60 wt %, expressed as an oxide ($TiO_2$) and based on the total weight of the catalyst. The titanium-containing carrier is formed by co-extruding or precipitating a titanium source with a $Al_2O_3$ precursor to form a porous support material comprising $Al_2O_3$ or by impregnating a titanium source onto a porous support material comprising $Al_2O_3$.

In another embodiment of the invention, provided is a method of producing a catalyst. The method comprises the preparation of a Ti-containing porous support material comprising $Al_2O_3$. This can be achieved by co-extruding or precipitating a titanium source with a $Al_2O_3$ precursor, shaping to form carrier extrudates, followed by drying and calcination. Alternatively, porous $Al_2O_3$ extrudates may be impregnated with a Ti-source followed by drying and calcination. The Ti-containing porous support is impregnated with a solution comprised of at least one Group VIB metal source and/or at least one Group VIII metal source. One or more sulfur containing organic additive is added in the production process either by co-impregnation with the metal sources or via a post-impregnation. In the process, the amount of the titanium source is sufficient so as to form a catalyst composition at least having a titanium content in the range of about 3 wt % to about 60 wt %, expressed as an oxide ($TiO_2$) and based on the total weight of the catalyst after calcination.

In another embodiment of the invention, there is provided a catalyst composition formed by the just above-described process. Another embodiment of the invention is a hydrotreating process carried out employing the catalyst composition.

These and still other embodiments, advantages and features of the present invention shall become further apparent from the following detailed description, including the appended claims.

FURTHER DETAILED DESCRIPTION OF THE INVENTION

Unless otherwise indicated, weight percent (wt. %) as used herein is the weight percent of the specified form of the substance, based upon the total weight of the product for which the specified substance or form of substance is a constituent or component. The weight percent of $TiO_2$ and Group VIB and Group VIII metals-oxides are based on the total weight of the final catalyst after calcination, i.e. excluding the presence of organics and/or water. The weight percent of organics in the final catalyst is based on the total weight of the final catalyst without calcination. It should further be understood that, when describing steps or components or elements as being preferred in some manner herein, they are preferred as of the initial date of this disclosure, and that such preference(s) could of course vary depending upon a given circumstance or future development in the art.

The Group VIB metal component in catalysts of the invention is selected from the group consisting of molybdenum, tungsten, chromium and a mixture of two or more of the foregoing, while molybdenum and/or tungsten is typically preferred, and molybdenum is typically more preferred. The Group VIII metal component is selected from group consisting of iron, cobalt and nickel, while nickel and/or cobalt are typically preferred. Preferred mixtures of metals include a combination of (a) nickel and/or cobalt and (b) molybdenum and/or tungsten. When hydrodesulfurization (sometimes hereafter referred to as "HDS") activity of the catalyst is important, a combination of cobalt and molybdenum is advantageous and typically preferred. When hydrodenitrogenation (sometimes hereafter referred to as "HDN") activity of the catalyst is important, a combination of nickel and either molybdenum or tungsten is advantageous and typically preferred.

The Group VIB metal component can be introduced as an oxide, an oxo acid, or an ammonium salt of an oxo or polyoxo anion. The Group VIB metal compounds are formally in the +6 oxidation state. Oxides and oxo acids are preferred Group VIB metal compounds. Suitable Group VIB metal compounds in the practice of this invention include chromium trioxide, chromic acid, ammonium chromate, ammonium dichromate, molybdenum trioxide, molybdic acid, ammonium molybdate, ammonium para-molybdate, tungsten trioxide, tungstic acid, ammonium tungsten oxide, ammonium metatungstate hydrate, ammonium para-tungstate, and the like. Preferred Group VIB metal compounds include molybdenum trioxide, molybdic acid, tungstic acid and tungsten trioxide. Mixtures of any two or more Group VIB metal compounds can be used; a mixture of products will be obtained when compounds having different Group VIB metal are used. The amount of Group VIB metal compound employed in the catalyst will typically be in the range of about 15 to about 30 wt % (as trioxide), based on the total weight of the catalyst.

The Group VIII metal component is usually introduced as an oxide, hydroxide or salt. Suitable Group VIII metal compounds include, but are not limited to, cobalt oxide, cobalt hydroxide, cobalt nitrate, cobalt carbonate, cobalt hydroxy-carbonate, cobalt acetate, cobalt citrate, nickel oxide, nickel hydroxide, nickel nitrate, nickel carbonate, nickel hydroxy-carbonate, nickel acetate, and nickel citrate. Preferred Group VIII metal compounds include cobalt carbonate, cobalt hydroxy-carbonate, cobalt hydroxide, nickel hydroxy-carbonate nickel carbonate and nickel hydroxide. Mixtures of two or more Group VIII metal compounds can be used; when the Group VIII metals of the compounds in the mixture are different, a mixture of products will be obtained. The amount of Group VIII metal compound employed in the catalyst will typically be in the range of about 2 to about 8 wt % (as oxide), based on the total weight of the catalyst. In a preferred embodiment of this invention, the amount of Group VIII metal compound is in the range of about 2 to about 6 wt % (as oxide), based on the total weight of the catalyst.

The titanium component will typically be introduced as titania, titanyl sulfate, titanium sulfate, Titanium(IV)bis(ammonium lactato)dihydroxide, titanium alkoxide (like Ti-isopropoxide, Ti-butoxide, Ti-ethoxide, etc.), or $TiCl_4$. The amount of the titanium component in the catalyst will typically be in the range of about 3 to about 60 wt %, expressed as an oxide ($TiO_2$) and based on the total weight of the catalyst. In a preferred embodiment of this invention, the amount of titanium component is in the range of about 5 wt % to about 50 wt %, expressed as an oxide ($TiO_2$) and based on the total weight of the catalyst.

The catalyst carrier may further comprise the conventional oxides, e.g., alumina, silica, silica-alumina, alumina with silica-alumina dispersed therein, silica-coated alumina, alumina-coated silica. As a rule, preference is given to the carrier being of alumina, silica-alumina, alumina with silica-alumina dispersed therein, alumina-coated silica or silica-coated alumina. Special preference is given to alumina and alumina containing up to 5 wt % of silica. The silicon component used in the preparation of the support will typically be sodium silicate (waterglass) or silicon dioxide. The combining of the silicon source with the alumina source may be carried out, e.g., by co-precipitation, kneading (co-extrusion), immersion, impregnation, etc. Preferably, the silicon source is introduced in the precipitation step. For the incorporation, the silicon compound can also be dispersed in a solvent if need be. A carrier containing a transition alumina, for example an eta, theta, or gamma alumina is preferred within this group, wherein a gamma-alumina carrier is most especially preferred.

The physical properties of the final carrier are not critical to the process according to the invention, since the synergistic effect between the use of titania containing carriers and sulfur containing organics should be always observed. However, it is known that there is a specific range of pore size, surface area and pore volume that performs better depending on the hydroprocessing application. All physical properties are measured via nitrogen physisorption techniques (Quadrasorb equipment and 300° C. pretreatment overnight under vacuum).

The carrier's pore volume (measured at 100 nm assuming de Boer and Kelvin equations to convert relative pressure into pore diameter), will generally be in the range of 0.2 to 2 ml/g, preferably 0.4 to 1 ml/g. The carrier specific surface area will generally be in the range of 50 to 400 $m^2/g$ (measured using the BET method). Preferably, the carrier will have a median pore diameter in the range of 5 to 15 nm.

The catalyst is employed in the conventional manner in the form of, for example, spheres or extrudates. Examples of suitable types of extrudates have been disclosed in the literature (see, int. al., U.S. Pat. No. 4,028,227).

The titanium compound can be incorporated into the carrier by impregnation, co-extrusion or precipitation, atomic layer deposition (ALD), or chemical vapor deposition (CVD). It is preferred that the titanium component is precipitated with the other components of the carrier, as it is believed, without being bound to theory, that precipitation results in a better dispersion of the titanium component employed in the highly active catalyst of this invention than what can be achieved via co-extrusion. Furthermore, the addition of the titanium component in this step prevents the need for an additional production step, as is the case when impregnation, ALD or CVD are used.

When adding the titanium via co-precipitation, known methods of co-precipitation can be used. In particular, Aluminum sulfate (Alum) and Titanyl sulfate (TiOSO$_4$) or titanium sulfate can be mixed in one stream and sodium aluminate (Natal) are dosed either simultaneously or subsequently to a heel of water at elevated T and a pH >7. The compositions and flow rates of Natal and Alum/TiOSO$_4$/titanium sulfate can be adjusted to achieve the desired final TiO$_2$ content in the thus created TiO$_2$/Al$_2$O$_3$ material. The pH can be controlled constantly with NaOH or H$_2$SO$_4$. Total dosing time can be varied between 10 min and 2 hours and the final solid concentration in the reactor will be approximately 2-10% on weight basis. In a subsequent step, the pH can be raised with NaOH or Natal to 9-12 to age. The slurry is then filtered and washed. The obtained solid can then be shaped into support bodies via extrusion, pelletizing or pressing which can be preceded by drying, spray-drying, milling, kneading and other methods known in the art to arrive at an extrudable material.

Strike-precipitation is very similar to co-precipitation processes, but the acidic stream is added to the basic components dispersed in the reactor vessel. Natal is diluted in water and under vigorous stirring waterglass is added while heating at 60° C. To this mixture aluminum sulfate and titanyl sulfate are added in 20 min with a final pH of 6.5. pH is not controlled during the addition and only allow to settle with the complete dossing of both streams. NaOH is used to adjust the pH to 7.2 and the mixture is aged for 1 hour at 60° C. while stirring. The cake is re-slurried with water, brought to pH 10 with ammonia and aged at 95° C. for 1 hour while stirring. Then, the slurry is filtered and washed with water to remove excess ammonia. The obtained solid can then be shaped into support bodies via extrusion, pelletizing or pressing which can be preceded by drying, spray-drying, milling, kneading and other methods known in the art to arrive at an extrudable material.

Step-precipitation can be carried out by reaction or precipitation of a Ti-precursor such as titanyl sulfate on a slurry of boehmite or pseudo-boehmite in water. Firstly alumina is precipitated via simultaneous dosing of sodium aluminate (Natal) and aluminum sulfate (Alum) to a heel of water at elevated T and a pH>7. The flows of Natal and Alum can be adjusted and the pH is controlled with NaOH or H$_2$SO$_4$. After aging at pH 9-12, filtration and washing, the thus-formed boehmite or pseudo-boehmite filter cake is re-slurried in water. To this slurry TiOSO$_4$ or titanium sulfate can be added either simultaneously or subsequently with NaOH at elevated T and pH>7 in about 10 minutes to 1 hour. The slurry is then filtered and washed. The thus thus-obtained solid can then be shaped into support bodies via extrusion pelletizing or pressing, which can be preceded by drying, spray-drying, milling, kneading and other methods known in the art to arrive at an extrudable material.

Co-extrusion is carried out by adding the titanium component to an alumina precursor component during a kneading or mixing step. The moment of addition is not fixed. The titanium component is added as a solid or as a solution. During the kneading or mixing step, the mix is heated to a desired temperature to remove any excess of solvent/water if needed. Kneading or mixing is finished when the desired moisture content (as determined by Loss on Ignition at a temperature in the range of 500-600° C.) is reached. Next, the mix is shaped to extrudates by using a suitable shaping technique. Besides extrusion, shaping can be accomplished via pelletizing or pressing.

The support bodies formed via precipitation and co-extrusion methods are then dried at a temperature in the range of 80-200° C. to remove a substantial amount of solvent/water and then calcined under air or inert conditions with or without steam at a temperature in the range of 400-900° C., resulting in the case of alumina, in a carrier containing a transition alumina e.g., a gamma, theta or eta-alumina. The titania component will also be present as an oxide, such as anatase or rutile. The calcination can be in a static or rotating mode.

When adding the titanium via impregnation, the titanium precursor is applied to a porous carrier, comprising Al$_2$O$_3$. Known methods of impregnation can be used. In particular, pore volume impregnation is preferred. A solution of aqueous titantia precursor, such as titanyl sulfate, titanium sulfate or Titanium(IV)bis(ammonium lactato)dihydroxide is prepared. Alternatively, a non-aqueous solution of an alkoxide titantia can be prepared. Then, the alumina extrudate is coated/impregnated with the titanuim solution. The impregnated carrier so formed is then dried at a temperature in the range of 80-200° C. to remove a substantial amount of solvent/water and then generally calcined under air or inert conditions with or without steam at a temperature in the range of 400-700° C.

In preparation of the TiO$_2$ containing support material it may be advantageous that part of the TiO$_2$ is introduced in one step, while another part of the TiO$_2$ is introduced in another step.

The calcined extrudates comprising Al$_2$O$_3$ and TiO$_2$ are then impregnated with a solution comprising a Group VIB metal source and/or a Group VIII metal source and optionally a phosphorous source. Impregnation is carried out by pore volume impregnation with an impregnation solution that can also comprise the selected sulfur containing organic additives in an appropriate solvent. The solvent used in preparing the additive impregnation solution is generally water, although other components such as methanol, ethanol and other alcohols may also be suitable. Impregnation can be carried out at room temperature or at elevated temperatures, but will typically be carried out at about 20-100° C. Instead of impregnating techniques, dipping methods, spraying methods, etc. can be used. After impregnation, an optional drying step is carried out with the objective to remove water, but leave (the largest part) of the organic additive on the catalyst. Drying is typically carried out at a temperature in the range of 25-220° C., although higher T, short contact time drying may also be applied. In case the sulfur containing organics are not added in the impregnation solution containing the metal-precursors, a subsequent impregnation step is carried out.

The final catalyst further comprises one or more sulfur containing organic additive. The one or more sulfur containing organic additive is added in amount of about 1 to about 30 wt % C, and preferably about 1 to about 20 wt % C, and more preferably about 5 to about 15 wt % C by weight of the final catalyst. This organic additive can be added together with the Group VIB metal source and/or a Group VIII metal source or in a separate step. The sulfur containing organic compound preferably is selected from the group of compounds comprising a mercapto-carboxylic acid of formula HS—R—COOH, where R is a linear or branched, and saturated or unsaturated carbon backbone ($C_1$-$C_{11}$ with or without hetero atoms such as nitrogen) with optionally a nitrogen-containing functional group such as amine, amide, etc. Suitable examples of such mercapto-carboxylic acid include, but are not limited to, thioglycolic acid, thiolactic acid, thiopropionic acid, mercapto succinic acid, and cysteine or mixtures thereof.

The metals, additional phosphorus, and the sulfur containing organic additives can be introduced onto the extrudates in one or more steps. The solutions used may or may not be heated.

For the one step approach, a solution containing at least one Group VIB metal source, at least one Group VIII metal source along with a phosphorus source in various ratios is prepared, typically using water as the solvent. Other carboxylic acids, such as citric acid, malonic acid, gluconic acid, adipic acid, and malic acid may be added. The resulting solution can be acidic and have a pH in the range of 0-7. An additional amount of the mercapto-carboxylic acid may be also added in a subsequent step. The said solution, either heated or as such, is introduced onto the support extrudates over a time period of 2-60 minutes (depending on the total amount and metal content of the catalyst) staying close to but not necessarily reaching the saturation of its pore volume. After impregnation the catalyst is allowed to age until free flowing extrudates are obtained and further aged between 60-160° C., preferably between 80-120° C. In case of using higher amounts of additives that correspond to an additive/metal ratio of above about 0.5 equivalents of the sulfur amount necessary for forming $MoS_2$, $WS_2$, $CoS$ and/or $NiS$, the resulting solution might be too viscous to impregnate. Additionally, precipitation of metals/additive should be avoided. In the event of precipitation, it is not advised to filter off the precipitate to have an impregnable solution and to further impregnate this filtered solution. Viscous solutions or solutions with precipitates should be avoided by various methods known in the art. One approach could be further dilution with water (or another appropriate solvent), possibly reaching volumes much higher than the available pore volume of the support. In such a case, the solution can be added in two or more steps, with drying steps in between. Heating the solution is another common method, though excess heating in air might result in an even more viscous solution. As such, cooling or handling the solution in an inert atmosphere is considered a viable approach. The final prepared catalyst is eventually subjected to a final ageing step between 60 and 160° C., preferably between 80 and 120° C. The ageing is normally performed in air. Optionally, ageing the catalysts in an inert atmosphere could be helpful to improve physical properties (such as avoid inter-extrudate lumping) but is not crucial for the invention. Prior to the activation (pre-sulfidation) and catalytic testing, a calcination treatment at temperatures above the activation and test temperature, especially if it leads to oxidation of the sulfur component, is not preferred, because it might hamper the catalytic activity. Furthermore, any other treatment that leads to the oxidation of the sulfur component is also to be avoided.

For the multiple step approach, metals are first introduced onto the support and the mercapto-carboxylic acid additive is introduced subsequently. The metal solution may or may not be heated. The support extrudates are impregnated with a solution containing at least one Group VIB metal source, at least one Group VIII metal source along with a phosphorus source in various ratios. Other carboxylic acids, such as citric acid and those mentioned above may be added, either as part of the metal solution or in subsequent steps. Water is typically used as the solvent for preparation of the impregnation solution, while it is believed other solvents known in the art can be used. The resulting solution can be acidic and have a pH in the range of 0 and 7. The said solution is introduced onto the extrudates using 90 to 120% saturation of its pores. During the mixing/impregnation process, the catalyst is allowed to age whilst rotating to enable even mixing of all the components. The impregnated material is further dried between 80 to 150° C., preferably between 100 to 120° C., until the excess of water is removed and 'free flowing' catalyst extrudates are obtained. The resulting catalyst can have a moisture content in the range of 0 to 20%. Optionally, the impregnated extrudates can be calcined at temperatures up to (for example) 600° C. The mercapto-carboxylic acid is then carefully added as droplets or a continuous stream to the resulting catalysts (as a neat liquid or as a mixture with water or another appropriate solvent) over a time period of typically 2 to 60 minutes depending on the total amount of catalyst and metal content thereof. The impregnated catalyst is allowed to age until free flowing extrudates are obtained. The catalyst is then subjected to a final ageing/heat treatment step (in air or under inert atmosphere) between 60 and 160° C., preferably between 80 and 120° C. The ageing is normally performed in air. Optionally ageing the catalysts in an inert atmosphere could be helpful to improve physical properties (such as to avoid inter-extrudate lumping) but is not crucial for the invention. Prior to the activation (pre-sulfidation) and catalytic testing, a calcination treatment at temperatures above the activation and test temperature, especially if it leads to oxidation of the sulfur component, is not preferred, because it might hamper the catalytic activity. Furthermore, any other treatment that leads to the oxidation of the sulfur component is also to be avoided.

In the practice of this invention, the impregnation solution may optionally include a phosphorus component. The phosphorous component is a compound which is typically a water soluble, acidic phosphorus compound, particularly an oxygenated inorganic phosphorus-containing acid. Examples of suitable phosphorus compounds include metaphosphoric acid, pyrophosphoric acid, phosphorous acid, orthophosphoric acid, triphosphoric acid, tetraphosphoric acid, and precursors of acids of phosphorus, such as ammonium hydrogen phosphates (mono-ammonium di-hydrogen phosphate, di-ammonium mono-hydrogen phosphate, tri-ammonium phosphate). Mixtures of two or more phosphorus compounds can be used. The phosphorus compound may be used in liquid or solid form. A preferred phosphorus compound is orthophosphoric acid ($H_3PO_4$) or an ammonium hydrogen phosphate, preferably in aqueous solution. The amount of phosphorus compound employed in the catalyst will preferably be at least about 1 wt % (as oxide $P_2O_5$), based on the total weight of the catalyst and more preferably in the range of about 1 to about 8 wt % (as oxide $P_2O_5$), based on the total weight of the catalyst.

Optionally, catalysts of the invention may be subjected to a sulfidation step (treatment) to convert the metal components to their sulfides. In the context of the present specification, the phrases "sulfiding step" and "sulfidation step" are meant to include any process step in which a sulfur-containing compound is added to the catalyst composition and in which at least a portion of the hydrogenation metal components present in the catalyst is converted into the sulfidic form, either directly or after an activation treatment with hydrogen. Suitable sulfidation processes are known in the art. The sulfidation step can take place ex situ to the reactor in which the catalyst is to be used in hydrotreating hydrocarbon feeds, in situ, or in a combination of ex situ and in situ to the reactor.

Ex situ sulfidation processes take place outside the reactor in which the catalyst is to be used in hydrotreating hydrocarbon feeds. In such a process, the catalyst is contacted with a sulfur compound, e.g., a polysulfide or elemental sulfur, outside the reactor and, if necessary, dried. In a second step, the material is treated with hydrogen gas at elevated temperature in the reactor, optionally in the presence of a feed, to activate the catalyst, i.e., to bring the catalyst into the sulfided state.

In situ sulfidation processes take place in the reactor in which the catalyst is to be used in hydrotreating hydrocarbon feeds. Here, the catalyst is contacted in the reactor at elevated temperature with a hydrogen gas stream mixed with a sulfiding agent, such as hydrogen sulfide or a compound which under the prevailing conditions is decomposable into hydrogen sulfide. It is also possible to use a hydrogen gas stream combined with a hydrocarbon feed comprising a sulfur compound which under the prevailing conditions is decomposable into hydrogen sulfide. In the latter case, it is possible to sulfide the catalyst by contacting it with a hydrocarbon feed comprising an added sulfiding agent (spiked hydrocarbon feed), and it is also possible to use a sulfur-containing hydrocarbon feed without any added sulfiding agent, since the sulfur components present in the feed will be converted into hydrogen sulfide in the presence of the catalyst. Combinations of the various sulfiding techniques may also be applied. The use of a spiked hydrocarbon feed may be preferred.

Apart from the activity benefit of these mercapto-carboxylic acids; the use of mercapto-carboxylic acids is beneficial because of the sulfiding properties of the final catalyst: due to the sulfur present in the compound, catalyst sulfidation is (in part) reached by the sulfur from the catalyst itself. This opens up possibilities for DMDS-lean (or feed only) or even hydrogen-only start-ups. In the context of the present specification, the phrases "sulfiding step" and/or "sulfidation step" and/or "activation step" are meant to include any process step in which at least a portion (or all) of the hydrogenation metal components present in the catalyst is converted into the (active) sulfidic form, usually after an activation treatment with hydrogen and optionally in the additional presence of a feed and/or (sulfur rich) spiking agent. Suitable sulfidation or activation processes are known in the art. The sulfidation step can take place ex situ to the reactor in which the catalyst is to be used in hydrotreating hydrocarbon feeds, in situ, or in a combination of ex situ and in situ to the reactor.

Regardless of the approach (ex situ vs in situ), catalysts described in this invention can be activated using the conventional start-up techniques known in the art. Typically, the catalyst is contacted in the reactor at elevated temperature with a hydrogen gas stream mixed with a sulfiding agent, such as hydrogen sulfide or a compound which under the prevailing conditions is decomposable into hydrogen sulfide. It is also possible to use a sulfur-containing hydrocarbon feed, without any added sulfiding agent, since the sulfur components present in the feed will be converted into hydrogen sulfide in the presence of the catalyst.

The catalyst compositions of this invention are those produced by the above-described process, whether or not the process included an optional sulfiding step.

The formed catalyst product of this invention is suitable for use in hydrotreating, hydrodenitrogenation and/or hydrodesulfurization (also collectively referred to herein as "hydrotreating") of hydrocarbon feed stocks when contacted by the catalyst under hydrotreating conditions. Such hydrotreating conditions are temperatures in the range of 250-450° C., pressure in the range of 5-250 bar, liquid space velocities in the range of 0.1-10 liter/hour and hydrogen/oil ratios in the range of 50-2000 Nl/l. Examples of suitable hydrocarbon feeds to be so treated vary widely, and include middle distillates, kero, naphtha, vacuum gas oils, heavy gas oils, and the like.

The following describes experimental preparation of the support and the catalyst, as well as use of the catalyst in hydrotreating a hydrocarbon feedstock to illustrate activity of the catalysts so formed. This information is illustrative only, and is not intend to limit the invention in any way.

EXAMPLES

Activity Test

The activity tests were carried out in micro flow reactors. Light Gas Oil (LGO) spiked with dimethyl disulfide (DMDS) (total S content of 2.5 wt %) was used for presulfiding, A Straight-run Gas Oil (SRGO), having a S content of 1.4-1.1 wt. % and a N content of 215-200 ppm, was used for testing in examples A-E. A VGO having a S content of 2.1 wt % and a N content of 1760 ppm N was used in example F. Testing takes place at equal volumetric catalyst intake. The relative volumetric activities for the various catalysts were determined as follows. For each catalyst the volumetric reaction constant $k_{vol}$ was calculated using $n^{th}$ order kinetics and a reaction order of 1.0 for HDN and 1.2 for HDS. The relative volumetric activities (RVA) of the different catalysts of the invention vs a comparative catalyst were subsequently calculated by taking the ratio of the reaction constants.

In the tables, SA is surface area, PV is pore volume, DMPD is mean pore diameter based on the desorption branch of the $N_2$ physisorption isother, S is sulfur, N is nitrogen, P is pressure, $g_{cat}t$ is the amount of catalyst in the reactor, LHSV is liquid hourly space velocity, and r.o. is reaction order.

Support Preparation

The following supports were made in accordance with the procedures described below. One support was prepared as a reference (S1, $Al_2O_3$). A summary of the properties for each support can be found in Table 1.

Example S1: Comparative S1

Comparative S1 was 100% standard $Al_2O_3$ prepared via a co-precipitation process. Aluminum sulfate (Alum) and sodium aluminate (Natal) were dosed simultaneously to a heel of water at 60° C. and pH 8.5. The flows of Natal and Alum were fixed and the pH was controlled constantly with NaOH or $H_2SO_4$. Total dosing time was approximately 1 hour and the final $Al_2O_3$ concentration in the reactor was approximately 4% on weight basis. The pH was then raised with NaOH or Natal to approximately 10 and the slurry was aged for 10 minutes while stirring. The slurry was filtered over a filter cloth and washed with water or a solution of ammonium bi-carbonate in water until sufficient removal of sodium and sulfate. The cake was dried, extruded and calcined.

Example S2: Support S2

The support S2 was prepared via a co-extrusion process of alumina and titania filter cakes. The alumina filter cake was prepared via the process described in Example S1 (prior extrusion). The titania filter cake was prepared via hydrolysis of an aqueous solution of $TiOSO_4$ at 99° C. for 5 hours followed by neutralization with NaOH to pH 7. The precipitate was filtered and washed salt free using water or a ammonium bi-carbonate solution. The two filter cakes were mixed in a kneader and extruded. The extrudates were calcined at 650° C. for 1 hour under airflow of ca. 10 nL/min. The final composition of the support (dry base) was found to be 49.7 wt. % $TiO_2$ and 50.3 wt. % $Al_2O_3$.

Example S3: Support S3

The support S3 was prepared via a co-precipitation process. Aluminum sulfate (Alum) and Titanyl sulfate ($TiOSO_4$) mixed in one stream and sodium aluminate (Natal) were dosed simultaneously to a heel of water at 60° C. and pH 8.5. The flows of Natal and Alum/$TiOSO_4$ were fixed and the pH was controlled constantly with NaOH or $H_2SO_4$. Total dosing time was approximately 1 hour and the final solid concentration in the reactor was approximately 4% on weight basis. The pH was then raised with NaOH or Natal to approximately 10 and the slurry was aged for 20 minutes while stirring. The slurry was filtered over a filter cloth and washed with water or a solution of ammonium bi-carbonate in water until sufficient removal of sodium and sulfate. The cake was dried, extruded and calcined at 650° C. for 1 hour under airflow of ca. 10 nL/min. The final composition of the support (dry base) was found to be 48.0 wt. % $TiO_2$ and 52.0 wt. % $Al_2O_3$.

Example S4: Support S4

The support S4 was prepared by co-precipitation using the same process as was used to prepare support S3, but using different amounts of the $TiO_2$ and $Al_2O_3$ precursors. The final composition of the support (dry base) was found to be 20.9 wt. % $TiO_2$ and 79.1 wt. % $Al_2O_3$.

Example S5: Support S5

The support S5 was prepared by consecutive (Step-) precipitation of alumina and titania. Firstly alumina (boehmite) was precipitated according to the procedure as described in S1. After filtration and proper washing, the precipitate was transferred back to the reactor. Boehmite filter cake was slurried in a stainless steel vessel with water and stirred while heating up to 60° C. To the slurry $TiOSO_4$ solution was dosed at a fixed rate and the pH was controlled at 8.5 via addition of NaOH solution. The dosing time was 25 minutes at 60° C. The slurry was thoroughly washed with water or a solution of ammonium bi-carbonate in water to remove salts, dried, extruded and calcined at 650° C. for 1 hour under airflow of ca. 10 nL/min. The final composition of the support (dry base) was found to be 21.1 wt. % $TiO_2$ and 78.9 wt. % $Al_2O_3$.

Example S6: Support S6

The support S6 was prepared by coating an aqueous titania precursor on alumina extrudates. The extrudates used consisted predominantly of γ-alumina and had a surface area of 271 $m^2/g$, a pore volume of 0.75 ml/g and a mean pore diameter of 8.7 nm as determined from the $N_2$ physisorption desorption isotherm. The pores of the alumina extrudates were filled with an aqueous solution of Titanium(IV)bis (ammonium lactato)dihydroxide, aged for 2 hours at 60° C. and pre-dried in a rotating pan until the appearance of the extrudates was no longer wet and eventually dried overnight at 120° C. The sample was calcined at 450° C. for 2 hours under airflow. This procedure was repeated a second time reaching higher titania loadings. The final composition of the support (dry base) was found to be 27.8 wt. % $TiO_2$ and 72.2 wt. % $Al_2O_3$.

Example S7: Support S7

The support S7 was prepared by coating an alkoxide titania precursor on alumina extrudates. The extrudates used had the same characteristics as those used in S6. The pores of the alumina were filled with Ti-isopropoxide solution in propanol. The aging process was carried out inside an atmosbag filled with a $N_2$ atmosphere at room temperature for 2 hours, and then the same was placed outside of the atmosbag for hydrolysis overnight (at RT). Finally the sample was dried at 120° C. overnight and calcined at 450° C. for 2 hours. The final composition of the support (dry base) was found to be 18.9 wt. % $TiO_2$ and 81.1 wt. % $Al_2O_3$.

Example S8: Support S8

The support S8 was prepared by a second coating with an alkoxide titania precursor on the $TiO_2$—$Al_2O_3$ extrudates obtained in S7. The procedure as described in S7 was repeated a second time reaching higher titania loadings. The final composition of the support (dry base) was found to be 43.7 wt. % $TiO_2$ and 56.3 wt. % $Al_2O_3$.

Example S9: Support S9

The support S9 was prepared by strike-precipitation of alumina and titania. Natal was diluted in water and under vigorous stirring waterglass was added while heating at 60° C. To this mixture aluminum sulfate and titanyl sulfate were added in 20 min with a final pH of 6.5. NaOH was used to adjust the pH to 7.2 and the mixture was aged for 1 hour at 60° C. while stirring. The cake was re-slurried with water, brought to pH 10 with ammonia and aged at 95° C. for 1 hour while stirring. Then, the slurry was filtered and washed with water to remove excess ammonia, dried, extruded and calcined at 650° C. for 1 hour under airflow of ca. 10 nL/min with 25 vol. % steam. The final composition of the support (dry base) was found to be 23.1 wt. % $TiO_2$, 3.2 wt. % $SiO_2$ and 73.7 wt. % $Al_2O_3$.

Example S10: Support S10

The support S10 was prepared in the same way as S9, but similar $TiO_2$ and lower $SiO_2$ sources were used. The final composition of the support (dry base) was found to be 21.3 wt. % $TiO_2$, 0.5 wt. % $SiO_2$ and 78.2 wt. % $Al_2O_3$.

Example S11: Support S11

The support S11 was prepared in the same way as S9, but lower $TiO_2$ and $SiO_2$ sources were used. The final composition of the support (dry base) was found to be 10.8 wt. % $TiO_2$, 0.5 wt. % $SiO_2$ and 88.7 wt. % $Al_2O_3$.

Example S12: Support S12

The support S12 was prepared by co-extrusion/kneading of $Al_2O_3$ cake and a titanium source. The Titanium(IV) isopropoxide (titania source) was added after 15 minutes kneading time. Later a vent hole was opened in order to let the alcohol evaporate. The kneaded material was extruded and then, the plate with wet extrudates was placed in the stove and kept there overnight at 120° C. Finally, the sample was calcined at 650° C. with 25% steam. The final composition of the support (dry base) was found to be 10.6 wt. % $TiO_2$, 0.87 wt. % $SiO_2$ and the rest is $Al_2O_3$.

The sodium content present is any of these supports is very low (<0.5 wt. %), since it is known as detrimental for the hydroprocessing activity. A summary of the compositions and characteristics of these different supports can be found in Table 1.

TABLE 1

Summary of supports prepared in Examples S1-12 and some of their physical properties.

| Support | Procedure | Weight % $TiO_2$ (*) | Weight % $SiO_2$ (*) | SA ($m^2/g$) | PV (ml/g) | DMPD (nm) |
|---|---|---|---|---|---|---|
| S1 | reference | 0 | — | 271 | 0.84 | 8.1 |
| S2 | co-extrusion | 47.9 | — | 200 | 0.52 | 8.7 |
| S3 | co-precipitation | 48.0 | — | 258 | 0.64 | 7.7 |
| S4 | co-precipitation | 20.9 | — | 304 | 0.86 | 7.9 |
| S5 | step-precipitation | 21.1 | — | 239 | 0.78 | 9.4 |
| S6 | coating | 27.8 | — | 275 | 0.48 | 7.8 |
| S7 | coating | 18.9 | — | 271 | 0.60 | 8.1 |
| S8 | coating | 43.7 | — | 229 | 0.38 | 5.5 |
| S9 | strike-precipitation | 23.1 | 3.2 | 293 | 0.56 | 6.1 |
| S10 | strike-precipitation | 21.3 | 0.5 | 236 | 0.56 | 8.0 |
| S11 | strike-precipitation | 10.8 | 0.5 | 240 | 0.65 | 9.0 |
| S12 | co-extrusion | 10.6 | 0.87 | 247 | 0.54 | 6.7 |

(*) based on the total weight of the support dry base

Catalyst Preparation and Testing

Example A: Positive Effect of $TiO_2$ Addition in Different Amounts and Via Different Preparation Methods on the Activity of NiMo Catalysts The following examples illustrate the positive effect of $TiO_2$ addition in the support on the activity of NiMo catalysts when combined with sulfur-containing organics in the catalyst preparation. The catalysts were prepared as described in examples A1-A12 using the same method to apply metals and S-organic additives to the catalysts and have a comparable volume loading of metals in the reactor. The catalysts were tested in a multi-reactor unit under medium pressure ultra-low sulfur diesel conditions at equal catalyst volume. Table 2 shows the pre-sulfidation and test conditions and Table 3 shows the activity results.

TABLE 2

Pre-sulfiding and testing (medium P ULSD) format used for activity testing of NiMo examples A.

| | Pre-sulfiding conditions | | | | |
|---|---|---|---|---|---|
| Feed | LHSV (1/hr) | P (bar) | $H_2$/oil (Nl/l) | Temperature (° C.) | Time (hours) |
| Spiked LGO | 3 | 45 | 300 | 320 | 24 |

| | Testing conditions | | | |
|---|---|---|---|---|
| Feed | P (bar) | $H_2$/oil (Nl/l) | Temperature (° C.) | Time @ condition (days) |
| SRGO 1.09 wt. % S and 200 ppmN | 45 | 300 | 350 | 4 |

Example A1: Comparative A1

Comparative A1 was prepared by consecutive impregnation of support Comparative A1 with (i) a NiMoP aqueous solution and, after drying, (ii) with thioglycolic acid. Both impregnations were performed in a rotating pan. The metal loaded intermediate was prepared from support S1 using impregnation with an amount of aqueous NiMoP solution equivalent to fill 105% of the pore volume, as is known for a person skilled in the art. The pore volume of the support was determined by a so-called water PV measurement in which the point of incipient wetness was determined by addition of water to the carrier extrudates. The NiMoP solution was prepared by dispersing of the required amount of $NiCO_3$ in water. The solution was then heated to 60° C. while stirring. Half of the required $H_3PO_4$ was added carefully to the solution and subsequently $MoO_3$ was added in small portions. The solution was heated up to 92° C. to obtain a clear solution. Finally, the rest of the $H_3PO_4$ was added to the solution and water was added to reach the concentration required for the desired metal loading. After impregnation, the extrudates were allowed to age for 1 hour in a closed vessel, after which drying was carried out at 120° C. for at least one hour. Subsequently, impregnation of the thus formed metal loaded intermediate with thioglycolic acid was carried out with neat thioglycolic acid to reach a loading of this compound on the catalysts of 3.5 mol/mol metals (Mo+Ni) in the catalyst. The thus formed composite was further aged for 2 hour, while rotating. The extrudates were then poured out into a petri dish and placed in a static oven at 80° C. for 16 hours. The composition of the metal impregnated dried catalyst (dry base) was 23.0 wt. % $MoO_3$, 4.5 wt. % NiO, 4.0 wt. % $P_2O_5$ and the rest is $Al_2O_3$.

Example A2: Invention A2

Invention A2 was prepared using support S2 and the same preparation process as in A1. The composition of the metal impregnated dried catalyst (dry base) was 17.2 wt. % $MoO_3$ and 3.3 wt. % NiO, 3.1 wt. % $P_2O_5$, 38.6 wt. % $TiO_2$ and the rest is $Al_2O_3$.

Example A3: Invention A3

Invention A3 was prepared using support S3 and the same preparation process as A1. The composition of the metal impregnated dried catalyst (dry base) was 19.4 wt. % $MoO_3$ and 3.8 wt. % NiO, 3.5 wt. % $P_2O_5$, 37.4 wt. % $TiO_2$ and the rest is $Al_2O_3$.

Example A4: Invention A4

Invention A4 was prepared using support S4 and the same preparation process as A1. The composition of the metal impregnated dried catalyst (dry base) was 23.7 wt. % $MoO_3$ and 4.5 wt. % NiO, 4.1 wt. % $P_2O_5$, 13.0 wt. % $TiO_2$ and the rest is $Al_2O_3$.

Example A5: Invention A5

Invention A5 was prepared using support S5 and the same preparation process as A1. The composition of the metal impregnated dried catalyst (dry base) was 24.4 wt. % $MoO_3$ and 4.7 wt. % NiO, 4.3 wt. % $P_2O_5$, 13.5 wt. % $TiO_2$ and the rest is $Al_2O_3$.

Example A6: Invention A6

Invention A6 was prepared using support S6 and the same preparation process as A1. The composition of the metal impregnated dried catalyst (dry base) was 18.0 wt. % $MoO_3$ and 3.4 wt. % NiO, 3.1 wt. % $P_2O_5$, 21.2 wt. % $TiO_2$ and the rest is $Al_2O_3$.

Example A7: Invention A7

Invention A7 was prepared using support S7 and the same preparation process as A1. The composition of the metal impregnated dried catalyst (dry base) was 20.1 wt. % MoO$_3$ and 4.0 wt. % NiO, 3.5 wt. % P$_2$O$_5$, 12.6 wt. % TiO$_2$ and the rest is Al$_2$O$_3$.

Example A8: Invention A8

Invention A8 was prepared using support S8 and the same preparation process as A1. The composition of the metal impregnated dried catalyst (dry base) was 18.7 wt. % MoO$_3$ and 3.7 wt. % NiO, 3.4 wt. % P$_2$O$_5$, 25.9 wt. % TiO$_2$ and the rest is Al$_2$O$_3$.

Example A9: Invention A9

Invention A9 was prepared using support S9 and the same preparation process as A1. The composition of the metal impregnated dried catalyst (dry base) was 18.0 wt. % MoO$_3$ and 3.5 wt. % NiO, 3.3 wt. % P$_2$O$_5$, 15.7 wt. % TiO$_2$ and the rest is Al$_2$O$_3$.

Example A10: Comparative A10

Comparative A10 was prepared using support S1 and the same preparation process as A1. The composition of the metal impregnated dried catalyst (dry base) was 24.8 wt. % MoO$_3$ and 4.4 wt. % NiO, 4.3 wt. % P$_2$O$_5$ and the rest is Al$_2$O$_3$.

Example A11: Invention A11

Invention A11 was prepared using support S10 and the same preparation process as A1. The composition of the metal impregnated dried catalyst (dry base) was 22.0 wt. % MoO$_3$ and 3.7 wt. % NiO, 3.8 wt. % P$_2$O$_5$, 0.37 wt. % SiO$_2$, 15.0 TiO$_2$ wt. % and the rest is Al$_2$O$_3$.

Example A12: Invention A12

Invention A12 was prepared using support S11 and the same preparation process as A1. The composition of the metal impregnated dried catalyst (dry base) was 23.6 wt. % MoO$_3$ and 4.1 wt. % NiO, 4.0 wt. % P$_2$O$_5$, 0.36 wt. % SiO$_2$, 7.4 wt. % TiO$_2$ and the rest is Al$_2$O$_3$.

impregnation method and amount of metals in the reactor. Since different LHSV have been used, RVAs of Inventions A2-A9 are relative to the activity of Comparative A1 and RVAs of Inventions A11-A12 are relative to Comparative A10.

Examples B: Positive Effect of TiO$_2$ Addition in Different Amounts and Via Different Preparation Methods on the Activity of CoMo Catalysts These examples illustrate the positive effect of addition of TiO$_2$ in the support on the activity of CoMo catalysts when combined with sulfur-containing organics in the preparation in a wide range of TiO$_2$ contents. Catalysts B1-B10 were all prepared using the same method to apply metals and thioglycolic acid to the catalyst and have a comparable volume loading of metals in the reactor. The catalysts were tested in a multi-reactor unit under medium pressure ultra-low sulfur diesel conditions. Table 4 shows the pre-sulfidation and Table 5 shows the activity results.

TABLE 4

Pre-sulfiding and testing (medium P ULSD) format used for activity testing of CoMo examples B.

| | Pre-sulfiding conditions | | | | |
|---|---|---|---|---|---|
| Feed | LHSV (1/hr) | P (bar) | H$_2$/oil (Nl/l) | Temperature (° C.) | Time (hours) |
| Spiked LGO | 3 | 45 | 300 | 320 | 24 |
| | Testing conditions | | | | |
| Feed | | P (bar) | H$_2$/oil (Nl/l) | Temperature (° C.) | Time @ condition (days) |
| SRGO 1.09 wt. % S and 200 ppmN | | 45 | 300 | 350 | 4 |

Example B1: Comparative B1

Comparative B1 was prepared by consecutive impregnation of support Comparative A1 with (i) a CoMoP aqueous

TABLE 3

The effect of the addition of TiO$_2$ in combination with a sulfur containing organic on the activity of supported NiMo catalysts in medium P ULSD activity testing.

| Example | Support | g$_{CAT}$ db Reactor | mg MoO$_3$ Reactor | LHSV HDN | N (ppm) | RVA HDN r.o. 1.0 | LHSV HDS | S (ppm) | RVA HDS r.o. 1.2 |
|---|---|---|---|---|---|---|---|---|---|
| Comparative A1 | S1 | 0.720 | 184 | 4.0 | 49 | 100% | 2.5 | 151 | 100% |
| Invention A2 | S2 | 0.881 | 168 | | 40 | 108% | | 99 | 113% |
| Invention A3 | S3 | 0.794 | 171 | | 22 | 152% | | 42 | 151% |
| Invention A4 | S4 | 0.647 | 170 | | 44 | 105% | | 119 | 107% |
| Invention A5 | S5 | 0.640 | 173 | | 35 | 123% | | 65 | 130% |
| Invention A6 | S6 | 0.990 | 189 | | 9 | 211% | | 24 | 170% |
| Invention A7 | S7 | 0.844 | 184 | | 19 | 165% | | 33 | 169% |
| Invention A8 | S8 | 0.936 | 195 | | 11 | 197% | | 28 | 171% |
| Invention A9 | S9 | 0.856 | 171 | | 17 | 175% | | 38 | 155% |
| Comparative A10 | S1 | 0.719 | 198 | | 58 | 100% | 2.7 | 144 | 100% |
| Invention A11 | S10 | 0.855 | 209 | | 9 | 246% | | 24 | 177% |
| Invention A12 | S11 | 0.820 | 215 | | 19 | 190% | | 29 | 169% |

As can be seen in Table 3, the catalysts that were prepared using a Ti-containing support are significantly more active in HDN and HDS than the comparative catalyst without any Ti (A1, A10) using the same S-containing organic additive, solution and, after drying, (ii) with thioglycolic acid. Both impregnations were performed in a rotating pan. The metal loaded intermediate was prepared from support S1 using impregnation with an amount of aqueous CoMoP solution equivalent to fill 105% of the pore volume, as is known for a person skilled in the art. The pore volume of the support was determined by a so-called water PV measurement in which the point of incipient wetness was determined by addition of water to the carrier extrudates. The CoMoP solution was prepared by dispersing of the required amount of $CoCO_3$ in water. The solution was then heated to 60° C. while stirring. Half of the required $H_3PO_4$ was added carefully to the solution and subsequently $MoO_3$ was added in small portions. The solution was heated up to 92° C. to obtain a clear solution. Finally, the rest of the $H_3PO_4$ was added to the solution and water was added to reach the concentration required for the desired metal loading. After impregnation, the extrudates were allowed to age for 1 hour in a closed vessel, after which drying was carried out at 120° C. for at least one hour. Subsequently, impregnation of the thus formed metal loaded intermediate with thioglycolic acid was carried out with neat thioglycolic acid to reach a loading of this compound on the catalysts of 3.5 mol/mol metals (Mo+Co) in the catalyst. The thus formed composite was further aged for 2 hours, while rotating. The extrudates were then poured out into a petri dish and placed in a static oven at 80° C. for 16 hours. The composition of the metal impregnated dried catalyst (dry base) was 24.0 wt. % $MoO_3$ and 4.6 wt. % CoO, 4.2 wt. % $P_2O_5$ and the rest is $Al_2O_3$.

Example B2: Invention B2

Invention B2 was prepared using support S3 and the same preparation process as B1. The composition of the metal impregnated dried catalyst (dry base) was 19.1 wt. % $MoO_3$ and 3.6 wt. % CoO, 3.3 wt. % $P_2O_5$, 37.2 wt. % $TiO_2$ and the rest is $Al_2O_3$.

Example B3: Invention B3

Invention B3 was prepared using support S5 and the same preparation process as B1. The composition of the metal impregnated dried catalyst (dry base) was 19.8 wt. % $MoO_3$ and 3.8 wt. % CoO, 3.3 wt. % $P_2O_5$, 12.4 wt. % $TiO_2$ and the rest is $Al_2O_3$.

Example B4: Inventive B4

Invention B4 was prepared using support S6 and the same preparation process as B1. The composition of the metal impregnated dried catalyst (dry base) was 19.1 wt. % $MoO_3$ and 3.6 wt. % CoO, 3.3 wt. % $P_2O_5$, 20.7 wt. % $TiO_2$ and the rest is $Al_2O_3$.

Example B5: Invention B5

Invention B5 was prepared using support S7 and the same preparation process as B1. The composition of the metal impregnated dried catalyst (dry base) was 19.8 wt. % $MoO_3$ and 3.8 wt. % CoO, 3.5 wt. % $P_2O_5$, 20.1 wt. % $TiO_2$ and the rest is $Al_2O_3$.

Example B6: Comparative B6

Comparative B6 was prepared using support S1 and the same preparation process as B1. The composition of the metal impregnated dried catalyst (dry base) was 26.5 wt. % $MoO_3$ and 4.8 wt. % CoO, 4.4 wt. % $P_2O_5$ and the rest is $Al_2O_3$.

Example B7: Invention B7

Invention B7 was prepared using support S9 and the same preparation process as B1. The composition of the metal impregnated dried catalyst (dry base) was 24.2 wt. % $MoO_3$ and 4.5 wt. % CoO, 4.1 wt. % $P_2O_5$, 1.8 wt. % $SiO_2$, 13.9 wt. % $TiO_2$ and the rest is $Al_2O_3$.

Example B8: Comparative B8

Comparative B8 was prepared using support S1 and the same preparation process as B1. The composition of the metal impregnated dried catalyst (dry base) was 26.1 wt. % $MoO_3$ and 4.8 wt. % CoO, 4.4 wt. % $P_2O_5$ and the rest is $Al_2O_3$.

Example B9: Invention B9

Invention B9 was prepared using support S10 and the same preparation process as B1. The composition of the metal impregnated dried catalyst (dry base) was 23.4 wt. % $MoO_3$ and 3.9 wt. % CoO, 4.0 wt. % $P_2O_5$, 0.36 wt. % $SiO_2$, 14.7 wt. % $TiO_2$ and the rest is $Al_2O_3$.

Example B10: Invention B10

Invention B10 was prepared using support S11 and the same preparation process as B1. The composition of the metal impregnated dried catalyst (dry base) was 20.5 wt. % $MoO_3$ and 4.3 wt. % CoO, 4.3 wt. % $P_2O_5$, 0.36 wt %. $SiO_2$, 7.2 wt. % $TiO_2$ and the rest is $Al_2O_3$.

TABLE 5

The effect of the addition of a sulfur containing organic in combination with $TiO_2$-containing support in the activity of CoMo catalysts in medium P ULSD activity testing.

| Example | Support | $g_{CAT}$ db Reactor | mg $MoO_3$ Reactor | LHSV HDN | N (ppm) | RVA HDN r.o. 1 |
|---|---|---|---|---|---|---|
| Comparative B1 | S1 | 0.730 | 194 | 3.5 | 50 | 100% |
| Invention B2 | S3 | 0.837 | 180 | | 26 | 158% |
| Invention B3 | S5 | 0.829 | 182 | | 34 | 131% |
| Invention B4 | S6 | 0.919 | 187 | | 21 | 160% |
| Invention B5 | S7 | 0.891 | 196 | | 20 | 174% |
| Comparative B6 | S1 | 0.731 | 215 | 3.2 | 34 | 100% |
| Invention B7 | S9 | 0.789 | 212 | | 4 | 224% |
| Comparative B8 | S1 | 0.701 | 203 | 4.0 | 88 | 100% |
| Invention B9 | S10 | 0.893 | 232 | | 19 | 259% |
| Invention B10 | S11 | 0.812 | 226 | | 40 | 186% |

As can be seen in Table 5, the catalysts that were prepared on a Ti-containing supports (B2-B5, B7 and B9-B10) are significantly more active in HDN than the comparative catalysts without any Ti (B1, B6 and B8) using the same S-organic additive and impregnation method. Since different LHSV have been used, RVAs of Inventions B2-B5 are relative to the activity of Comparative B1, RVA of Inventions B7 is relative to Comparative B6 and RVAs of Inventions B9-B10 are relative to Comparative B8.

Examples C: Positive Effect of a Wide Variation of S-Organic Additives on the Activity of NiMo and CoMo Catalysts These examples illustrate the positive effect of S-organic additives on the activity of NiMo and CoMo catalysts when combined with $TiO_2$-containing. The catalyst examples are 4 NiMo and 4 CoMo grades based on the same Ti—Al support and different sulfur-organic additives. They were prepared using the same method to apply metals and have a comparable volume loading of metals in the reactor. The catalysts were tested in a multi-reactor unit under medium pressure ultra-low sulfur diesel conditions. Table 6 shows the pre-sulfidation and test conditions used for both NiMo and CoMo catalysts and Table 7 and 8 shows the activity results.

TABLE 6

Pre-sulfiding and testing (medium P ULSD) format used for activity testing of NiMo and CoMo catalysts from examples C.

Pre-sulfiding conditions

| Feed | LHSV (1/hr) | P (bar) | $H_2$/oil (Nl/l) | Temperature (° C.) | Time (hours) |
|---|---|---|---|---|---|
| Spiked LGO | 3 | 45 | 300 | 320 | 24 |

Testing conditions

| Feed | P (bar) | $H_2$/oil (Nl/l) | Temperature (° C.) | Time @ condition (days) |
|---|---|---|---|---|
| SRGO 1.09 wt. % and 200 ppmN | 45 | 300 | 350 | 4 |

Example C1: Comparative C1

Comparative C1 was prepared by impregnation of a NiMoP aqueous solution (no S-organic additive) on support S11. The impregnation was performed in a rotating pan with an amount of aqueous NiMoP solution equivalent to fill 105% of the pore volume, as is known for a person skilled in the art. The pore volume of the support was determined by a so-called water PV measurement in which the point of incipient wetness was determined by addition of water to the carrier extrudates. The NiMoP solution was prepared by dispersing of the required amount of $NiCO_3$ in water. The solution was then heated to 60° C. while stirring. Half of the required $H_3PO_4$ was added carefully to the solution and subsequently $MoO_3$ was added in small portions. The solution was heated up to 92° C. to obtain a clear solution. Finally, the rest of the $H_3PO_4$ was added to the solution and water was added to reach the concentration required for the desired metal loading. After impregnation, the extrudates were allowed to age for 1 hour in a closed vessel, after which drying was carried out at 120° C. for at least one hour. The extrudates were then poured out into a petri dish and placed in a static oven at 80° C. for 16 hours. The composition of the metal impregnated dried catalyst (dry base) was 23.6 wt. % $MoO_3$ and 4.1 wt. % NiO, 4.0 wt. % $P_2O_5$, 0.36 wt. % $SiO_2$, 7.4 wt. % $TiO_2$ and the rest is $Al_2O_3$.

Example C2: Invention C2

Invention C2 was prepared using Comparative C1. A second impregnation with thiolactic acid at 95% PV saturation was performed without the use of $H_2O$, and aged for 2 hours at 80° C. The extrudates were then poured out into a petri dish and placed in a static oven at 80° C. for 16 hours. The composition of the metal impregnated dried catalyst (dry base) was the same as Comparative C1.

Example C3: Invention C3

Invention C3 was prepared using Comparative C1. A second impregnation with 3-mercaptopropionic acid was performed with a fixed amount reaching 15 wt. % carbon of the total catalyst, and aged for 2 hour at 80° C. The extrudates were then poured out into a petri dish and placed in a static oven at 80° C. for 16 hours. The composition of the metal impregnated dried catalyst (dry base) was the same as Comparative C1.

Example C4: Invention C4

Invention C4 was prepared Comparative C1. A second impregnation with mercaptosuccinic acid was performed with a fixed amount reaching 15 wt. % carbon of the total catalyst, and aged for 2 hours at 80° C. The extrudates were then poured out into a petri dish and placed in a static oven at 80° C. for 16 hours. The composition of the metal impregnated dried catalyst (dry base) was the same as Comparative C1.

TABLE 7

The effect of the addition of a sulfur-containing organic in combination with $TiO_2$-containing support in the activity of NiMo catalysts in medium P ULSD activity testing.

| Example | Support | $g_{CAT}$ db Reactor | mg $MoO_3$ Reactor | LHSV HDN | N (ppm) | RVA HDN r.o. 1 | LHSV HDS | S (ppm) | RVA HDS r.o. 1.2 |
|---|---|---|---|---|---|---|---|---|---|
| Comparative C1 | S11 | 0.787 | 206 | 4.0 | 66 | 100% | 2.7 | 175 | 100% |
| Invention C2 | S11 | 0.770 | 202 |  | 40 | 153% |  | 65 | 147% |
| Invention C3 | S11 | 0.768 | 201 |  | 56 | 116% |  | 104 | 120% |
| Invention C4 | S11 | 0.780 | 205 |  | 46 | 124% |  | 74 | 128% |

As observed in Table 7, the NiMo catalysts with different types of S-containing organic additives (C2-C4) show higher HDN and HDS activities than the comparative (C1) example without organic additives using the same support (S11) and similar metal loadings (ca. 200 g $MoO_3$/Reactor).

Example C5: Comparative C5

Comparative C5 was prepared from support S11 using impregnation with an amount of aqueous CoMoP solution equivalent to fill 105% of the pore volume, as is known for a person skilled in the art. The CoMoP solution was prepared by dispersing of the required amount of $CoCO_3$ in water. The solution was then heated to 60° C. while stirring. Half of the required $H_3PO_4$ was added carefully to the solution and subsequently $MoO_3$ was added in small portions. The solution was heated up to 92° C. to obtain a clear solution. Finally, the rest of the $H_3PO_4$ was added to the solution and water was added to reach the concentration required for the desired metal loading. After impregnation, the extrudates were allowed to age for 1 hour in a closed vessel, after which drying was carried out at 120° C. for at least one hour. The extrudates were then poured out into a petri dish and placed in a static oven at 80° C. for 16 hours. The composition of the metal impregnated dried catalyst (dry base) was 23.2 wt. % $MoO_3$, 3.9 wt. % CoO, 2.4 wt. % $P_2O_5$, 0.37 wt. % $SiO_2$, 7.5 wt. % $TiO_2$ and the rest is $Al_2O_3$.

Example C6: Invention C6

Invention C6 was prepared using Comparative C5. A second impregnation with thiolactic acid at 95% PV saturation was performed without the use of $H_2O$, and aged for 2 hours at 80° C. The extrudates were then poured out into a petri dish and placed in a static oven at 80° C. for 16 hours. The composition of the metal impregnated dried catalyst (dry base) was the same as Comparative C5.

Example C7: Invention C7

Invention C7 was prepared using Comparative C5. A second impregnation with 3-mercaptopropionic acid was performed with a fixed amount reaching 15 wt. % carbon of the total dried base catalyst, and aged for 2 hours at 80° C. The extrudates were then poured out into a petri dish and placed in a static oven at 80° C. for 16 hours. The composition of the metal impregnated dried catalyst (dry base) was the same as Comparative C5.

Example C8: Invention C8

Invention C8 was prepared using Comparative C5. A second impregnation with mercaptosuccinic acid was performed with a fixed amount reaching 15 wt. % carbon of the total dried base catalyst, and aged for 2 hours at 80° C. The extrudates were then poured out into a petri dish and placed in a static oven at 80° C. for 16 hours. The composition of the metal impregnated dried catalyst (dry base) was the same as Comparative C5.

As observed in Table 8, the CoMo catalysts with different types of S-containing organic additives (C6-C8) show higher HDN activity than the comparative (C5) example without organic additives using the same support (S11) and similar metal loadings (ca. 200 g $MoO_3$/Reactor).

Examples D: The Synergetic Effect of Sulfur-Containing Organics & Ti—$Al_2O_3$ Support for NiMo Catalysts In the following examples, it is illustrated that the use of a $TiO_2/Al_2O_3$ support in combination with S-organics results in a synergetic effect for NiMo catalysts. The activity benefit of applying a $TiO_2/Al_2O_3$ support in combination with S-organics is higher than can be expected based on the separate contributions of the (i) $TiO_2/Al_2O_3$ support and (ii) the S-organics as determined in separate experiments and can therefore be regarded as surprising. The NiMo catalyst examples presented have comparable metal loadings and were tested in a multi-reactor unit under medium pressure ultra-low sulfur diesel conditions. Table 9 shows the experimental settings for the pre-sulfidation and test conditions and Table 10 shows the amount of catalyst that was loaded in the different reactors and the activity results.

TABLE 9

Pre-sulfiding and test (medium P ULSD) format used for activity testing of NiMo catalysts from examples D.

| | Pre-sulfiding conditions | | | | |
|---|---|---|---|---|---|
| Feed | LHSV (1/hr) | P (bar) | $H_2$/oil (Nl/l) | Temperature (° C.) | Time (hours) |
| Spiked LGO | 3 | 45 | 300 | 320 | 24 |

| | Testing conditions | | | |
|---|---|---|---|---|
| Feed | P (bar) | $H_2$/oil (Nl/l) | Temperature (° C.) | Time @ condition (days) |
| SRGO 1.09 wt. % and 200 ppmN | 45 | 300 | 350 | 4 |

Example D1: Comparative D1

Comparative D1 was prepared using support S1 and impregnated with NiMoP aqueous solution and no organic additive. The method used for preparation of the impregnation solution is the same as the method described in Example C1. The composition of the metal impregnated dried catalyst (dry base) was 24.8 wt. % $MoO_3$, 4.2 wt. % NiO, 2.7 wt. % $P_2O_5$ and the rest $Al_2O_3$.

TABLE 8

The effect of the addition of a sulfur-containing organic in combination with $TiO_2$-containing support in the activity of CoMo catalysts in medium P ULSD activity testing.

| Example | Support | $g_{CAT}$ db Reactor | mg $MoO_3$ Reactor | LHSV HDN | N (ppm) | RVA HDN r.o. 1 |
|---|---|---|---|---|---|---|
| Comparative C5 | S11 | 0.77 | 197 | 4.0 | 89 | 100% |
| Invention C6 | S11 | 0.79 | 203 | | 52 | 158% |
| Invention C7 | S11 | 0.8 | 223 | | 63 | 137% |
| Invention C8 | S11 | 0.77 | 197 | | 74 | 116% |

Example D2: Comparative D2

Comparative D2 was prepared using support S1 and impregnated with NiMoP aqueous solution and thioglycolic acid additive. The method used for preparation of the impregnation solution, and the amount of S-organics applied (relative to the metals) is the same as the method described in Example A1. The composition of the metal impregnated dried catalyst (dry base) was the same as D1.

Example D3: Comparative D3

Comparative D3 was prepared using support S10 and impregnated with NiMoP aqueous solution and no organic additive. The method used for preparation of the impregnation solution is the same as the method described in Example C1. The composition of the metal impregnated dried catalyst (dry base) was 21.8 wt. % $MoO_3$, 3.6 wt. % NiO, 2.4 wt. % $P_2O_5$, 0.38 wt. % $SiO_2$, 15.4 wt. % $TiO_2$ and the rest $Al_2O_3$.

Example D4: Invention D4

Invention D4 was prepared using support S10 and impregnated with NiMoP aqueous solution and thioglycolic acid additive. The method used for preparation of the impregnation solution, and the amount of S-organics applied (relative to the metals) is the same as the method described in Example A1. The composition of the metal impregnated dried catalyst (dry base) was the same as Example D3.

Example D5: Comparative D5

Comparative D5 was prepared using support S11 and impregnated with NiMoP aqueous solution and no organic additive. The method used for preparation of the impregnation solution is the same as the method described in Example C1. The composition of the metal impregnated dried catalyst (dry base) was 23.3 wt. % $MoO_3$, 3.7 wt. % NiO, 2.5 wt. % $P_2O_5$, 0.38 wt. % $SiO_2$, 7.6 wt. % $TiO_2$ and the rest $Al_2O_3$.

Example D6: Invention D6

Invention D6 was prepared using support S11 and impregnated with NiMoP aqueous solution and thioglycolic acid additive. The method used for preparation of the impregnation solution, and the amount of S-organics applied (relative to the metals) is the same as the method described in Example A1. The composition of the metal impregnated dried catalyst (dry base) was the same as Example D5.

As observed in Table 10, the activity benefit of the catalysts of the invention (D4 and D6), containing $TiO_2$ in the support and S-containing organics are larger than expected from the individual benefits of titania addition (D3 and D5, without S-organic additive) or use of S-organic additive (D2, without titania). Both inventions are ultimately compared with Comparative D1 (no organic and no titania) at similar metal loadings.

To determine the extent of the synergy between the effect of (i) $TiO_2$ addition to the support and (ii) addition of S-containing organics on catalyst activity, we determined Synergy factor Sxy as defined in Equation 1. $RVA_{0,0}$ is the relative activity of the reference catalyst (without Ti (x) or organics (y)) Values for ax and by were determined from the RVA of the comparative catalyst that is based on the $Al_2O_3$ support with the same organics ($RVA_{x,0}=RVA_{0,0}+ax$) and the RVA of the comparative catalyst based on the $TiO_2$—$Al_2O_3$ support without organics ($RVA_{0,y}=RVA_{0,0}+by$). A positive value of Sxy signifies that the activity of catalysts of the invention is higher than could be expected based on the individual contributions of the support and the organics on catalyst activity.

$$RVA_{x,y}=RVA_{0,0}+ax+by+Sxy \qquad [\text{Eq. 1}]$$

Examples E: The Synergetic Effect of Sulfur-Containing Organics & Ti—$Al_2O_3$ Support for CoMo Catalysts In the following examples, it is illustrated that the use of a $TiO_2/Al_2O_3$ support in combination with S-organics results in a synergetic effect for CoMo catalysts for a wide range of metal loadings. The activity benefit of applying a $TiO_2/Al_2O_3$ support in combination with S-organics is higher than can be expected based on the separate contributions of the (i) $TiO_2/Al_2O_3$ support and (ii) the S-organics as determined in separate experiments and can therefore be regarded as surprising. The CoMo catalyst examples presented have been tested in a multi-reactor unit under medium pressure ultra-low sulfur diesel conditions. The set of examples have been tested at a comparable volumetric metal loading. A first set at high metal loading (Examples E1-E4) and a second set at low metal loading (Examples E5-E8). Tables 11 and 13 show the experimental settings for the pre-sulfidation and test conditions and Tables 12 and 14 show the amount of catalyst that was loaded in the different reactors and the activity results.

TABLE 10

The effect of the addition of a sulfur containing organic in combination with $TiO_2$-containing support in the activity of NiMo catalysts in medium P ULSD activity testing.

| Example | Support | $g_{CAT}$ db Reactor | mg $MoO_3$ Reactor | LHSV HDN | N (ppm) | RVA HDN r.o. 1 | Sxy HDN | LHSV HDS | S (ppm) | RVA HDS r.o. 1.2 | Sxy HDS |
|---|---|---|---|---|---|---|---|---|---|---|---|
| Comparative D1 | S1  | 0.710 | 196 | 4.0 | 87 | 100% |     | 2.7 | 261 | 100% |    |
| Comparative D2 | S1  | 0.713 | 197 |     | 67 | 121% |     |     | 183 | 110% |    |
| Comparative D3 | S10 | 0.829 | 201 |     | 53 | 141% |     |     |  94 | 135% |    |
| Invention D4   | S10 | 0.847 | 205 |     |  6 | 370% | 208 |     |  20 | 221% | 76 |
| Comparative D5 | S11 | 0.762 | 197 |     | 73 | 114% |     |     | 211 | 106% |    |
| Invention D6   | S11 | 0.793 | 205 |     | 23 | 218% |  83 |     |  29 | 192% | 76 |

Example E1: Comparative E1

Comparative E1 was prepared using support S1 and impregnated with CoMoP aqueous solution and no organic additive. The method used for preparation of the impregnation solution is the same as the method described in Example C5. The composition of the metal impregnated dried catalyst (dry base) was 24.6 wt. % $MoO_3$, 4.3 wt. % CoO, 2.6 wt. % $P_2O_5$ and the rest $Al_2O_3$.

Example E2: Comparative E2

Comparative E2 was prepared using support S1 and impregnated with CoMoP aqueous solution and thioglycolic acid additive. The method used for preparation of the impregnation solution is the same as the method described in Example B1. The composition of the metal impregnated dried catalyst (dry base) was the same as E1.

Example E3: Comparative E3

Comparative E3 was prepared using support S11 and impregnated as the method described in Example E1. The composition of the metal impregnated dried catalyst (dry base) was 21.8 wt. % $MoO_3$, 3.7 wt. % CoO, 2.3 wt. % $P_2O_5$, 0.38 wt. % $SiO_2$, 15.2 wt. % $TiO_2$ and the rest $Al_2O_3$.

Example E4: Invention E4

Invention E4 was prepared using support S11 and impregnated as the method described in Example E1. The composition of the metal impregnated dried catalyst (dry base) was the same as Example E3.

TABLE 11

Pre-sulfiding and test (medium P ULSD) format used for activity testing of the high metal loading CoMo catalysts from examples E.

Pre-sulfiding conditions

| Feed | LHSV (1/hr) | P (bar) | $H_2$/oil (Nl/l) | Temperature (° C.) | Time (hours) |
|---|---|---|---|---|---|
| Spiked LGO | 3 | 45 | 300 | 320 | 24 |

Testing conditions

| Feed | P (bar) | $H_2$/oil (Nl/l) | Temperature (° C.) | Time @ condition (days) |
|---|---|---|---|---|
| SRGO 1.09 wt. % and 200 ppmN | 45 | 300 | 350 | 4 |

As observed in Table 12, the activity benefit of the invention (E4) is larger than expected from the individual benefits of titania addition (E3, without S-organic additive) or use of S-organic additive (E2, without titania). The activity of all catalysts is ultimately compared with Comparative E1 (no organic and no titania) at similar metal loadings.

Example E5: Comparative E5

Comparative E5 was prepared using support S1 and impregnated, as E1, with CoMoP aqueous solution without organics. The composition of the metal impregnated dried catalyst (dry base) was 19.3 wt. % $MoO_3$ and 3.6 wt. % CoO, 3.2 $P_2O_5$ wt. % and the rest is $Al_2O_3$.

Example E6: Comparative E6

Comparative E6 was prepared using support S9 and impregnated as E5. The composition of the metal impregnated dried catalyst (dry base) was 17.5 wt. % $MoO_3$ and 3.2 wt. % CoO, 2.9 $P_2O_5$ wt. %, 15.8 $TiO_2$ wt. %, 2.0 $SiO_2$ wt. % and the rest is $Al_2O_3$.

Example E7: Comparative E7

Comparative E7 was prepared using support S1. Firstly, it was impregnated with CoMoP aqueous solution as E1 and after drying a second impregnation with thioglycolic acid (3.5 mol/mol metals in the catalyst) in a rotating pan was performed. The intermediate was further aged for 2 hour, while rotating, and then poured out into a petri dish and placed in a static oven at 80° C. for 16 hours. The composition of the metal impregnated dried catalyst (dry base) was 19.3 wt. % $MoO_3$ and 3.6 wt. % CoO, 3.2 $P_2O_5$ wt. % and the rest is $Al_2O_3$.

Example E8: Invention E8

Invention E8 was prepared using support S9 and impregnated as E7. The composition of the metal impregnated dried catalyst (dry base) was 17.5 wt. % $MoO_3$ and 3.2 wt. % CoO, 2.9 $P_2O_5$ wt. %, 15.7 $TiO_2$ wt. % and 2.1 $SiO_2$ wt. %.

TABLE 12

The effect of the addition of a sulfur containing organic in combination with $TiO_2$-containing support in the activity of high metal loading CoMo catalysts in medium P ULSD activity testing.

| Example | Support | $g_{CAT}$ db Reactor | mg $MoO_3$ Reactor | LHSV HDN | N (ppm) | RVA HDN r.o. 1 | Sxy HDN |
|---|---|---|---|---|---|---|---|
| Comparative E1 | S1 | 0.682 | 186 | 4.0 | 100 | 100% | |
| Comparative E2 | S1 | 0.701 | 192 | | 81 | 132% | |
| Comparative E3 | S10 | 0.829 | 201 | | 67 | 145% | |
| Invention E4 | S10 | 0.83 | 201 | | 37 | 226% | 49 |

TABLE 13

Pre-sulfiding and test (medium P ULSD) format used for activity testing of low metal loading CoMo examples E.

| | Pre-sulfiding conditions | | | | |
|---|---|---|---|---|---|
| Feed | LHSV (1/hr) | P (bar) | $H_2$/oil (Nl/l) | Temperature (° C.) | Time (hours) |
| Spiked LGO | 3 | 45 | 300 | 320 | 24 |

| | Testing conditions | | | |
|---|---|---|---|---|
| Feed | P (bar) | $H_2$/oil (Nl/l) | Temperature (° C.) | Time @ condition (days) |
| SRGO 1.4 wt. % S and 200 ppmN | 45 | 300 | 350 | 3 |

TABLE 15

Pre-sulfiding and test (HC-PT) format used for activity testing of low metal loading NiMo examples F.

| | Pre-sulfiding conditions | | | | |
|---|---|---|---|---|---|
| Feed | LHSV (1/hr) | P (bar) | $H_2$/oil (Nl/l) | Temperature (° C.) | Time (hours) |
| Spiked LGO | 3 | 45 | 300 | 320 | 24 |

| | Testing conditions | | | |
|---|---|---|---|---|
| Feed | P (bar) | $H_2$/oil (Nl/l) | Temperature (° C.) | Time @ condition (days) |
| VGO 2.1 wt. % S and 1760 ppmN | 120 | 1000 | 380 | 3 |

TABLE 14

The effect of the addition of an organic in combination with $TiO_2$-containing support in the activity of CoMo catalysts low metal loading in medium P ULSD activity testing.

| Example | Support | $g_{CAT}$ db Reactor | Mg $MoO_3$ Reactor | LHSV HDN | N (ppm) | RVA HDN r.o. 1 | Sxy HDN | LHSV HDS | S (ppm) | RVA HDS r.o. 1.2 | Sxy HDS |
|---|---|---|---|---|---|---|---|---|---|---|---|
| Comparative E5 | S1 | 0.634 | 136 | 2.6 | 86 | 100% | | 2.0 | 244 | 100% | |
| Comparative E6 | S9 | 0.736 | 143 | 2.6 | 38 | 192% | | | 119 | 126% | |
| Comparative E7 | S1 | 0.611 | 131 | 2.8 | 68 | 129% | | | 143 | 108% | |
| Invention E8 | S9 | 0.714 | 139 | 2.8 | 7 | 362% | 141 | | 24 | 172% | 38 |
| CoMo commercial catalyst | | 0.731 | 196 | 2.6 | 27 | 235% | | | 50 | 161% | |
| CoMo commercial catalyst | | 0.742 | 196 | 2.8 | 28 | 235% | | | 41 | 161% | |

In the case of low metal loading catalysts a synergetic effect between the support and the organics is also observed. This was surprising since neither $TiO_2$ nor the organics applied in the preparation will contribute directly to the activity of the catalysts. This effect can be clearly observed for a wide range of metal loadings (high ca. 220 g $MoO_3$/L and low around 140 g $MoO_3$/L) and most easily observed in the HDN activities. Finally, the activity of the low metal loading catalyst of the invention (E8) can be compared to that of a CoMo commercial catalyst that was included in the same test.

Examples F: The Benefit of $TiO_2$—$Al_2O_3$ Co-Extruded Support in Combination with S-Organic Additives for NiMo Catalysts in HC-PT Application The following examples illustrate the positive effect of $TiO_2$ addition in the support on the activity of NiMo catalysts when combined with S-containing organics in the catalyst preparation. The catalysts were prepared as described in examples F1-F2 using the same method to apply metals to the catalysts and have a comparable volume loading of metals in the reactor. The catalysts were tested in a multi-reactor unit HC-PT conditions. Table 15 shows the pre-sulfidation and test conditions and Table 16 shows the activity results.

Example F1: Comparative F1

Comparative F1 was prepared using support S1 and a NiMoP aqueous solution. The catalyst was prepared from support S1 impregnated with an amount of aqueous NiMoP solution equivalent to fill 105% of the pore volume, as is known for a person skilled in the art. The pore volume of the support was determined by a so-called water PV measurement in which the point of incipient wetness was determined by addition of water to the carrier extrudates. The NiMoP solution was prepared by dispersing of the required amount of $NiCO_3$ in water. The solution was then heated to 60° C. while stirring. Half of the required $H_3PO_4$ was added carefully to the solution and subsequently $MoO_3$ was added in small portions. The solution was heated up to 92° C. to obtain a clear solution. Finally, the rest of the $H_3PO_4$ was added to the solution and water was added to reach the concentration required for the desired metal loading. After impregnation, the extrudates were allowed to age for 1 hour in a closed vessel, after which drying was carried out at 120° C. for at least one hour. The extrudates were then poured out into a petri dish and placed in a static oven at 80° C. for 16 hours. The composition of the metal impregnated dried catalyst (dry base) was 25.9 wt. % $MoO_3$, 4.1 wt. % NiO, 4.4 wt. % $P_2O_5$ and the rest is $Al_2O_3$.

Example F2: Invention F2

Invention F2 was prepared using support S12 and impregnated with an amount of aqueous NiMoP solution equivalent to fill 105% of the pore volume, as is known for a person skilled in the art. The pore volume of the support was determined by a so-called water PV measurement in which the point of incipient wetness was determined by addition of water to the carrier extrudates. The NiMoP solution was prepared by dispersing of the required amount of $NiCO_3$ in water. The solution was then heated to 60° C. while stirring. Half of the required $H_3PO_4$ was added carefully to the solution and subsequently $MoO_3$ was added in small portions. The solution was heated up to 92° C. to obtain a clear solution. Finally, the rest of the $H_3PO_4$ was added to the solution and water was added to reach the concentration required for the desired metal loading. After impregnation, the extrudates were allowed to age for 1 hour in a closed vessel, after which drying was carried out at 120° C. for at least one hour. The extrudates were then poured out into a petri dish and placed in a static oven at 80° C. for 16 hours. Subsequently, impregnation of the thus formed metal loaded intermediate with thioglycolic acid was carried out with neat thioglycolic acid to reach a loading of this compound on the catalysts of 3.5 mol/mol metals (Mo+Ni) in the catalyst. The thus formed composite was further aged for 2 hours, while rotating. The composition of the metal impregnated dried catalyst (dry base) was 24.1 wt. % $MoO_3$, 4.0 wt. % NiO, 4.1 $P_2O_5$ wt. %, 7.2 wt. % $TiO_2$, 0.59 wt. % $SiO_2$ and the rest is $Al_2O_3$.

TABLE 16

The effect of the addition of an organic in combination with $TiO_2$-containing support in the activity of NiMo catalysts in HC-PT activity testing.

| Example | Support | $g_{CAT}$ db Reactor | Mg $MoO_3$ Reactor | LHSV HDN | N (ppm) | RVA HDN r.o. 1 |
|---|---|---|---|---|---|---|
| Comparative F1 | S1 | 0.719 | 186 | 1.70 | 182 | 100 |
| Invention F2 | S12 | 0.940 | 226 | | 57 | 156 |

As can be observed in table 16, Invention F2 containing S-organic additives and titanium in the support show higher benefits in both HDN and HDS than the Comparative F1 example. The benefit of combining a S-organic additive and a Ti-containing support is visible also for HC-PT applications.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition.

The invention may comprise, consist, or consist essentially of the materials and/or procedures recited herein.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

Each and every patent or other publication or published document referred to in any portion of this specification is incorporated in toto into this disclosure by reference, as if fully set forth herein.

This invention is susceptible to considerable variation in its practice. Therefore the foregoing description is not intended to limit, and should not be construed as limiting, the invention to the particular exemplifications presented hereinabove.

The invention claimed is:

1. A method of producing a catalyst, the method comprising
    co-extruding a titanium source with a porous material comprising $Al_2O_3$ to form a titanium-containing carrier extrudate,
    drying and calcining the extrudate, and
    impregnating the calcined extrudate with a sulfur containing organic additive, at least one Group VIB metal source and/or at least one Group VIII metal source,
    the amount of the titanium source being sufficient so as to form a catalyst composition at least having a titanium content in the range of about 1 wt % to about 60 wt %, expressed as an oxide ($TiO_2$), based on the total weight of the catalyst.

2. A method of producing a catalyst, the method comprising
    precipitating a titanium source with an aluminum source,
    extruding the precipitate to form a titanium-containing carrier extrudate,
    drying and calcining the extrudate, and
    impregnating the calcined extrudate with a sulfur containing organic additive, at least one Group VIB metal source and/or at least one Group VIII metal source,
    the amount of the titanium source being sufficient so as to form a catalyst composition at least having a titanium content in the range of about 1 wt % to about 60 wt %, expressed as an oxide ($TiO_2$), based on the total weight of the catalyst.

3. The method of claim 2 wherein the precipitation comprises the steps of (a) simultaneous dosing of sodium aluminate and aluminum sulfate to water at a fixed pH (b) the formed alumina filter cake is re-slurried in water (c) to this slurry $TiOSO_4$ or titanium sulfate is added at a fixed pH>7 controlled by an alkaline solution.

4. The method of claim 2 wherein the precipitation comprises the steps of (a) the aluminum source and the titanium source are mixed in one stream and sodium aluminate is dosed either simultaneously or subsequently to water at a pH>7.

5. A method of producing a catalyst, the method comprising
impregnating a porous material comprising $Al_2O_3$ with a titanium source to form a titanium-containing carrier, drying and calcining the carrier, and
impregnating the calcined carrier with a sulfur containing organic additive, at least one Group VIB metal source and/or at least one Group VIII metal source,
the amount of the titanium source being sufficient so as to form a catalyst composition at least having a titanium content in the range of about 1 wt % to about 60 wt %, expressed as an oxide ($TiO_2$), based on the total weight of the catalyst.

6. The method of claim 1, 2 or 5 further comprising the impregnation with a sulfur containing organic additive, at least one Group VIB metal source and/or at least one Group VIII metal source being performed in a single step with a solution comprising a sulfur containing organic additive, at least one Group VIB metal source and/or at least one Group VIII metal source.

7. The method of claim 1, 2 or 5 further comprising the impregnation with a sulfur containing organic additive, at least one Group VIB metal source and/or at least one Group VIII metal source being performed in more than one step, wherein the carrier is impregnated with a solution comprising at least one Group VIB metal source and/or at least one Group VIII metal source, followed by a step of impregnating the carrier with a solution comprising a sulfur containing organic additive.

8. The method of claim 1, 2 or 5 wherein the titanium source is selected from the group consisting of titanyl sulfate, titanium sulfate, titanium alkoxide or Titanium(IV) bis(ammonium lactato)dihydroxide.

* * * * *